United States Patent
Nakamura

(10) Patent No.: US 8,601,782 B2
(45) Date of Patent: Dec. 10, 2013

(54) STEEL CORD FOR REINFORCING RUBBER ARTICLE AND PNEUMATIC TIRE

(75) Inventor: Keisuke Nakamura, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 222 days.

(21) Appl. No.: 13/127,925

(22) PCT Filed: Nov. 13, 2009

(86) PCT No.: PCT/JP2009/006100
§ 371 (c)(1),
(2), (4) Date: May 18, 2011

(87) PCT Pub. No.: WO2010/055684
PCT Pub. Date: May 20, 2010

(65) Prior Publication Data
US 2011/0209808 A1    Sep. 1, 2011

(30) Foreign Application Priority Data

Nov. 14, 2008   (JP) ................. 2008-292733

(51) Int. Cl.
*D02G 3/48* (2006.01)

(52) U.S. Cl.
USPC ............................................. 57/218; 57/237

(58) Field of Classification Search
USPC .......... 57/212, 213, 214, 218, 230, 231, 236, 57/237; 152/451, 527, 556
See application file for complete search history.

(56) References Cited

U.S. PATENT DOCUMENTS

| | | | |
|---|---|---|---|
| 5,461,850 A | * | 10/1995 | Bruyneel et al. ............. 57/212 |
| 6,863,103 B1 | | 3/2005 | Masubuchi et al. |
| 7,458,200 B2 | * | 12/2008 | Kish ............................... 57/237 |
| 2011/0284144 A1 | * | 11/2011 | Nakamura .................... 152/526 |
| 2012/0043003 A1 | * | 2/2012 | Masubuchi et al. .......... 152/556 |

FOREIGN PATENT DOCUMENTS

| | | |
|---|---|---|
| CN | 1091791 A | 9/1994 |
| CN | 2270069 Y | 12/1997 |
| CN | 2730915 Y | 10/2005 |
| JP | 2002-30586 A | 1/2002 |
| JP | 2002-339277 A | 11/2002 |
| JP | 2006-22440 A | 1/2006 |
| WO | 01/34900 A1 | 5/2001 |

OTHER PUBLICATIONS

International Search Report for PCT/JP2009/006100, 2 pages, Feb. 9, 2010.
Chinese Office Action and Search Report issued in Chinese Application No. 200980145264.3 dated Nov. 5, 2012.

* cited by examiner

*Primary Examiner* — Shaun R Hurley
(74) *Attorney, Agent, or Firm* — Sughrue Mion, PLLC

(57) ABSTRACT

A steel cord for reinforcing a rubber article has a multi-twisted structure formed by twisting a plurality of sheath strands (2) formed by twisting a plurality of wires around a core strand (1) formed by twisting a plurality of wires, and the core strand (1) and the sheath strands (2) include at least a 2-layer-twisted structure formed by twisting core wires and sheath wires respectively. The relationship represented by the following formula $1.8 \leq [(S \cdot \cos^2\alpha)/\{r \cdot (\phi 1 + \phi 2)\}] \times 100 \leq 4.2$ is satisfied, wherein $\phi 1$: the diameter of an outermost wire of the strand (1), $\phi 2$: the diameter of an outermost wire of the strand (2), r: the center distance between the strand (1) and the strand (2), S: the cross section of the strand (2), and $\alpha$: the twist angle of the strand (2).

4 Claims, 4 Drawing Sheets

STEEL CORD FOR REINFORCING RUBBER ARTICLE AND PNEUMATIC TIRE

CROSS REFERENCE TO RELATED APPLICATION

This application is a National Stage of International Application No. PCT/JP2009/006100 filed on Nov. 13, 2009, which claims priority from Japanese Patent Application No. 2008-292733, filed on Nov. 14, 2008, the contents of all of which are incorporated herein by reference in their entirety.

TECHNICAL FIELD

The present invention relates to a steel cord for reinforcing a rubber article and a pneumatic tire (hereinafter occasionally simply referred to as "tire"), more particularly relates to a steel cord for reinforcing a rubber article applicable favorably to a heavy duty tire to be mounted on a heavy vehicle, such as a transportation vehicle or a construction machine, and to the heavy duty tire.

BACKGROUND ART

A tire for a construction vehicle which is mounted on a heavy dump truck, etc. to be utilized at a large scale civil construction site or an ore mine is subjected to harsh working conditions of a heavy load on rough ground surfaces. Since a tire for a construction vehicle destined for running over rough surfaces receives a strong force from a road surface as well as a high load by nature, high tensile strength (breaking force) is required for a steel cord to be used for respective reinforcing layers, such as a carcass and a belt.

Consequently, for such reinforcing layers a steel cord with a so-called multi-twisted structure, such as a 7×(3+9) structure and a 7×(3+9+15) structure, has been used broadly, in which a plurality of sheath strands formed by twisting a plurality of wires are twisted around a core strand formed by twisting a plurality of wires.

Further, a tire for a construction vehicle has high risks of being damaged as the result of incurring the high load on the rough ground surface, and such countermeasures have been taken, as use of a large diameter cord as a reinforcing cord, and use of a so-called high tensile strength steel to increase the tensile breaking force per unit area of the cord, so as to increase the tensile breaking strength in the axial direction of the cord.

A problem has been known with respect to a multi-twisted cord with a plurality of twisted strands, that the cord strength is lower than the total of the strengths of the wires to such an extent as is unexplainable from the decrease attributable to the twist angle. To cope with the problem, Patent Document 1 proposes a method for avoiding premature breakage of a part of the wires to suppress the decrease of the strength in the axial direction of the cord. Patent Document 2 proposes a steel cord with a multi-twisted structure, which realizes improvement of the cut resistant property of a tire without increasing the weight and thickness. Further, Patent Document 3 proposes a steel cord with a multi-twisted structure, which improves the cut resistant property of a tire without decreasing the strength in the axial direction of the cord.

RELATED ART

Patent Document

Patent Document 1: WO 2001/034900
Patent Document 2: Japanese Unexamined Patent Application Publication No. 2002-339277
Patent Document 3: Japanese Unexamined Patent Application Publication No. 2006-22440

SUMMARY OF INVENTION

Technical Problem

A conventional steel cord as a reinforcing material for a heavy duty tire has not been very satisfactory under circumstances as described below.

More particularly, a belt ply, especially the innermost belt ply, of a heavy duty tire forced to run on rough surfaces, is bent widely, when it treads on a relatively obtuse projection, and it has been often observed that a steel cord for reinforcing a belt ply is led to premature cord breakage by a tensile force in the axial direction of the cord. Meanwhile, when it treads on a relatively sharply pointed projection, it is bent locally, and it has been often observed that cord breakage occurs by a shear force from the projection in a belt reinforcing ply closest to the tread surface. From the above, for a steel cord to be utilized as a reinforcing material for a construction vehicle tire, both the tensile strength in the axial direction of the cord and the strength in the shearing direction are required.

In case a belt ply is thick, when it is bent by treading on a projection, an inner side belt cord, namely located on an outer side of a bend, undergoes easily a tensile force which leads to the breaking elongation. Consequently, a belt ply is required to be as thin as possible.

Under such circumstances, an object of the present invention is to provide a steel cord for reinforcing a rubber article, which can improve cut resistant property, namely durability against cut, such as a notch and a perforation, in the case of treading on an obtusely or sharply pointed projection, without decreasing the strength in the axial direction of the cord, and without increasing the thickness in the radial direction, namely without increasing the weight of a tire, as well as a tire utilizing the steel cord for reinforcing a rubber article as a reinforcing material, especially a construction vehicle tire.

Means for Solving the Problem

For attaining the object, the present inventor has intensively studied a squeezing force of sheath strands toward a core strand with respect to a steel cord with a multi-twisted structure formed by twisting a plurality of sheath strands around a core strand, thereby completing the present invention.

More particularly, a steel cord for reinforcing a rubber article according to the present invention relates to a steel cord for reinforcing a rubber article with a multi-twisted structure formed by twisting a plurality of sheath strands formed by twisting a plurality of wires around a core strand formed by twisting a plurality of wires, and the core strand and the sheath strands being constituted of an at least 2-layer-twisted structure formed by twisting core wires and sheath wires respectively,
wherein the diameter of an outermost wire of the core strand $\phi1$ (mm), the diameter of an outermost wire of the sheath strand $\phi2$ (mm), the center distance between the core strand and the sheath strand r (mm), the cross section of the sheath strand S (mm$^2$) and the twist angle of the sheath strands $\alpha$ represented by the following formula:

$$\alpha(\text{rad})=(\pi/2)-\tan^{-1}[\{(cd-sd)/sp\}\pi]$$

wherein cd stands for the cord diameter (mm), sd for the sheath strand diameter (mm), and sp for the sheath strand pitch (mm); satisfy the relationship represented by the following formula:

$$1.8 \leq [(S \cdot \cos^2\alpha)/\{r \cdot (\phi 1 + \phi 2)\}] \times 100 \leq 4.2.$$

With respect to a steel cord for reinforcing a rubber article according to the present invention, it is preferable that the core strand has a 3-layer-twisted structure with a plurality of twisted wires and the number of the sheath strands is 7 to 10. The cord diameter cd is preferably 5.0 mm or larger.

Additionally, a pneumatic tire according to the present invention relates to a pneumatic tire having a carcass as a skeletal structure comprising ply(s) of radially oriented cords bridging a left-and-right pair of beads and extending toroidally, as well as a belt located on the outer side in the radial direction of the tire at a crown part of the carcass,
wherein the belt comprises at least 4 belt plies each with arrayed cords, which are crossed between the laminated plies, and the cords constituting at least 2 of the belt plies are the steel cords for reinforcing a rubber article according to the present invention.

Effect of the Invention

According to the present invention, the cut resistant property against a notch, a perforation, etc. in the case of treading on an obtusely or sharply pointed projection, can be improved without decreasing the strength in the axial direction of the cord, and without increasing the weight of a tire. The present invention is particularly useful for a construction vehicle tire.

DESCRIPTION OF EMBODIMENTS

An embodiment of the present invention will be described more specifically below.

Figure 1:
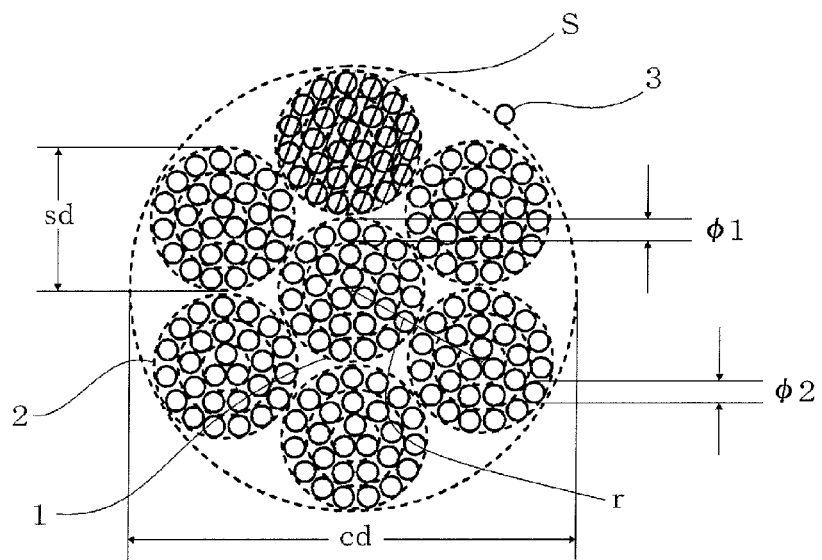
FIG. 1 is a cross-sectional view of a steel cord with a multi-twisted structure.

In the case of a preferred embodiment of a steel cord according to the present invention shown in FIG. 1, six sheath strands 2 are twisted around a core strand 1. Further, on the outer circumference of the cord a wrapping wire 3 is coiled spirally along the cord circumference.

The core strand 1 is formed by twisting a plurality of wires, and has a twisted structure of 3+9+15 according to the illustrated embodiment. The sheath strand 2 is also formed by twisting a plurality of wires, and has a twisted structure of 3+9+15 according to the illustrated embodiment.

Figure 2:
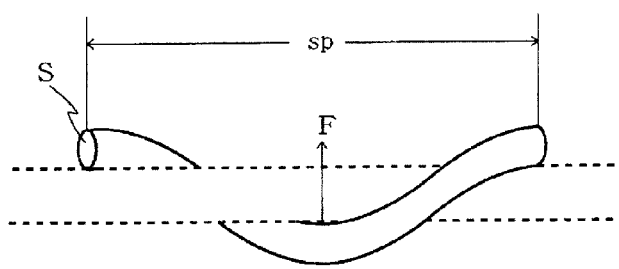
FIG. 2 is an illustrative view of a core strand and one of sheath strands.

FIG. 2 shows the relationship among a squeeze force F exerted on a core strand 1 by a sheath strand 2, the center distance r between the core strand 1 and the sheath strand 2, and the cross section S of the sheath strand, as well as the twist pitch sp of the sheath strand 2. The squeeze force F is proportional to the cross section S of the sheath strand and $\cos^2\alpha$ of the twist angle $\alpha$, and in an inversely proportional relation to the center distance r and the contact area between the core strand 1 and the sheath strand 2. The contact area can be approximated by the sum ($\phi 1 + \phi 2$) of the diameter $\phi 1$ of a wire in the outermost layer of the core strand 1 and the diameter $\phi 2$ of a wire in the outermost layer of the sheath strand 2.

According to the present invention, it is essential that the squeeze force F expressed by the above relationship should satisfy the following formula:

$$1.8 \leq [(S \cdot \cos^2\alpha)/\{r \cdot (\phi 1 + \phi 2)\}] \times 100 \leq 4.2$$

and preferably the following formula:

$$2.0 \leq [(S \cdot \cos^2\alpha)/\{r \cdot (\phi 1 + \phi 2)\}] \times 100 \leq 4.0.$$

In case the value of $[(S \cdot \cos^2\alpha)/\{r \cdot (\phi 1 + \phi 2)\}] \times 100$ is larger than 4.2, a stress caused prior to breakage of the steel cord by squeezing each sheath strand 2 against the core strand 1, when the steel cord receives a shear force, becomes so large that a part of the wires are led to premature breakage prior to the breakage of the steel cord, and the required resistance to shear force becomes unattainable.

Meanwhile, in case the value of $[(S \cdot \cos^2\alpha)/\{r \cdot (\phi 1 + \phi 2)\}] \times 100$ is smaller than 1.8, the pitch of the sheath strand 2 must be extremely long, which may cause a problem in manufacturing, and the wires constituting the sheath strand 2 become extremely thinner than the wires constituting the core strand 1 and a wire of the sheath strand 2 may break prematurely prior to the cord breakage, which makes the required shear resistance unattainable.

Figure 3:
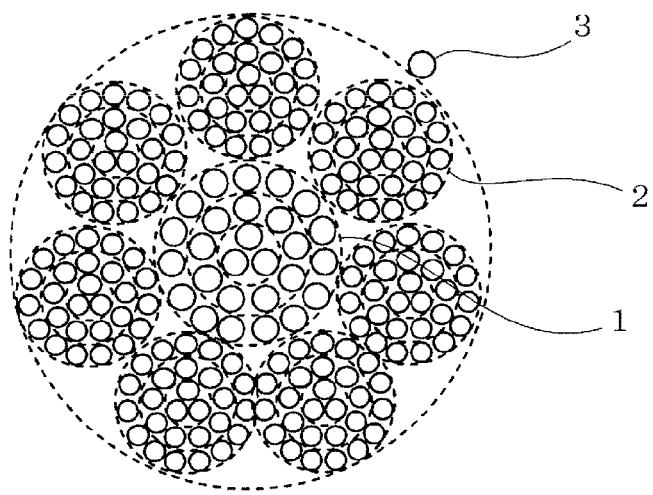
FIG. 3 is a cross-sectional view of a steel cord in Example 1.

Another preferred embodiment of a steel cord according to the present invention is shown in FIG. 3. In the steel cord, the core strand 1 has a 3-layer-twisted structure of 3+9+15. Seven sheath strands 2 twisted around the core strand 1 have also a 3-layer-twisted structure of 3+9+15.

Figure 4:
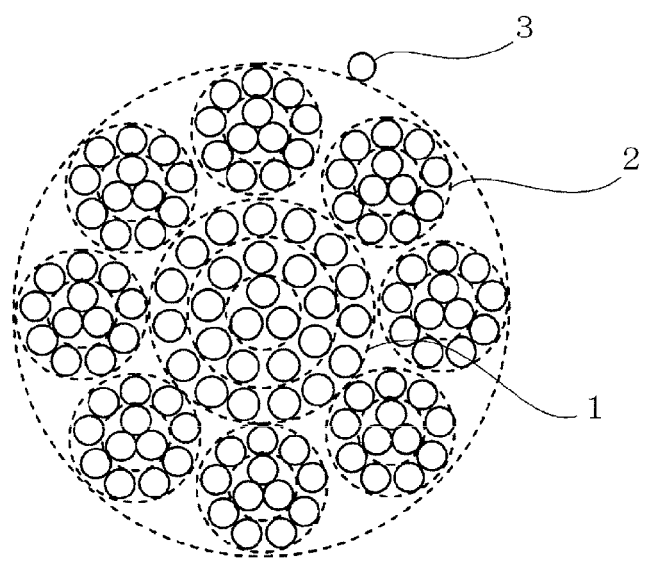
FIG. 4 is a cross-sectional view of a steel cord in Example 2.
Figure 5:
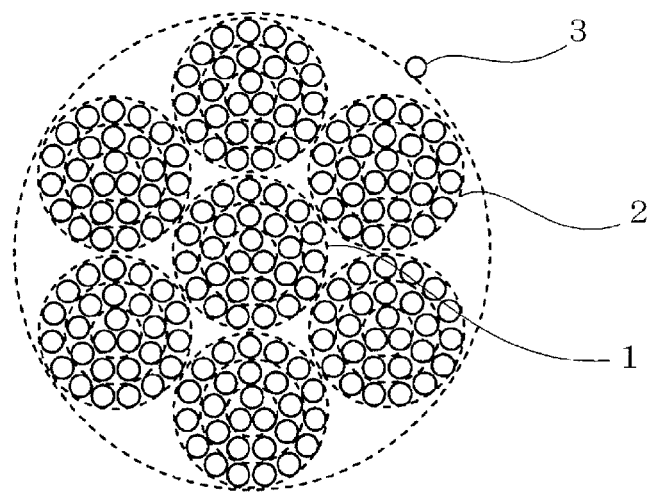
FIG. 5 is a cross-sectional view of a steel cord in Conventional Example 1.
Figure 6:
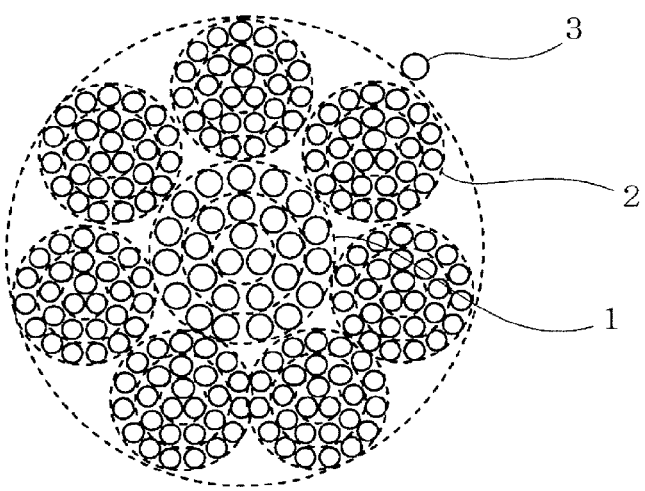
FIG. 6 is a cross-sectional view of a steel cord in Example 3.

Another preferred embodiment of a steel cord according to the present invention is shown in FIG. 4. In this steel cord, the core strand 1 has a 3-layer-twisted structure of 3+9+15. Eight sheath strands 2 twisted around the core strand 1 have also a 2-layer-twisted structure of 3+9.

Although, according to the present invention, there is no particular restriction on the wire diameters of the core strand 1 and the sheath strand 2 and the twisted structure thereof, the core strand has preferably a 3-layer-twisted structure and the sheath strand has a 2-layer-twisted structure in order to attain the intended object of the present invention.

The number of the sheath strands 2 wound around the core strand 1 is preferably 7 to 10. In case the number is 6 or less, the tensile strength with respect to the cord cross section may not be attained sufficiently. Meanwhile, in case the number of windings of the sheath strands 2 is 11 or more, the diameter of a filament constituting the core strand becomes extremely thick, so that the bending rigidity of the steel cord becomes high and the surface strain of the wires increases when applied to a rubber article such as a tire, making sufficient resistance to fatigue unattainable.

Further, it is preferable according to the present invention to use a high tensile strength steel with the carbon content of 0.80 to 1.00% by mass for the wires used to secure the strength of the rubber article. Further to suppress distortion of the cord and to secure good factory workability, a wrapping wire 3 should preferably be wound around the circumference of the cord.

Further with respect to the wires constituting the respective strands, the wire diameters should be preferably in a range of 0.20 to 0.60 mm. In case the diameters of the respective wires are less than 0.20 mm, the steel cord cannot attain sufficient tensile strength, and in case they exceed 0.60 mm, when the cord is applied to a tire, the surface strain of the wires in the steel cord at a contact area of the tire increases so as to decrease the resistance to fatigue, which is undesirable. The cord diameter cd is preferably 5.0 mm or larger in order to attain the desired cord strength.

Figure 7:
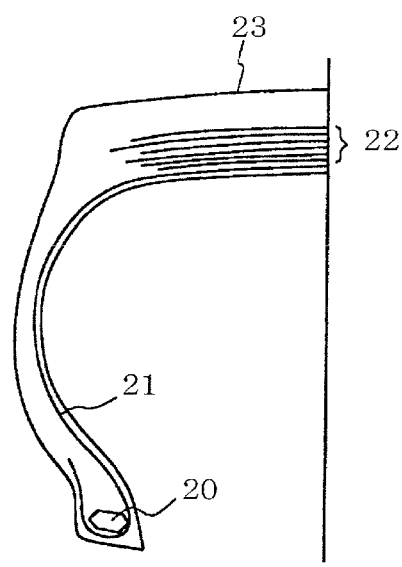
FIG. 7 is a cross-sectional view of a construction vehicle tire according to an embodiment of the present invention.

As a preferred embodiment of a tire according to the present invention, to which a steel cord according to the present invention is applied as a reinforcing material for the belt, can be presented a construction vehicle tire shown in FIG. 7. The construction vehicle tire is provided with a carcass 21 constituted with ply(s) of steel cords extending in the radial direction between a pair of bead cores 20, at least 4 plies (6 plies in the illustration) of a belt 22 located outer side in the tire diametral direction of the crown part of the carcass 21, and a tread 23 located outer side in the tire diametral direction of the belt 22. According to the present invention, at least 2 plies of the belt plies are constituted with cords that are steel cords for reinforcing a rubber article according to the present invention. By this means the cut resistant property in the case of treading on an obtusely or sharply pointed projection can be improved without decreasing the strength in the axial direction of the tire cord, and without increasing the tire weight.

EXAMPLES

The present invention will be described below by way of Examples.

Examples 1 to 3

Conventional Examples 1 and 2

Various steel cords shown in Table 1 below were produced. The respective cross-sectional structures perpendicular to the cord axes of the steel cords are shown in FIGS. 3 to 6. FIG. 3 corresponds to Example 1, FIG. 4 to Example 2, FIG. 5 to Conventional Example 1, and FIG. 6 to Example 3, respectively. The wires used for the steel cords utilized a high tensile strength steel with the carbon content of 0.82% by mass. The following evaluation tests were conducted on the steel cords.

(Shear Resistance)

The sample steel cord was applied to belt plies of a construction vehicle tire under a condition of the same size of 53/80R63 as a reinforcing material and the weight was measured. The results were expressed by indices based on the tire according to Conventional Example 1 as 100. The lower value means the better result.

(Tire Weight)

The sample steel cord was applied to belt plies of a construction vehicle tire of the size of 53/80R63 as a reinforcing material. The respective tires were so designed that the weights of the steel cords were identical. The respective tires were seated on the standard rim according to the JATMA standards, and mounted on a construction vehicle, which traveled at the average vehicle speed of 40 km/h for 1000 hours. Thereafter the number of cuts having reached the ply utilizing the steel cord was counted in the section equivalent to 1/5 of the circumferential length of each tire.

(Number of Cuts Incurred)

The sample steel cord was applied to belt plies of a construction vehicle tire of the size of 53R63 as a reinforcing material. The respective tires were so designed that the weights of the steel cords were identical. The respective tires were seated on the standard rim according to the JATMA standards, and mounted on a construction vehicle, which traveled at the average vehicle speed of 40 km/h for 1000 hours. Thereafter the number of cuts having reached the ply utilizing the steel cord was counted in the section equivalent to 1/5 of the circumferential length of each tire.

The obtained results are shown also in Table 1.

TABLE 1

| | | Conventional Example 1 | Conventional Example 2 | Example 1 | Example 2 | Example 3 |
|---|---|---|---|---|---|---|
| | Cord structure of core strand and sheath strand | 1 + 6 | 1 + 6 | 1 + 7 | 1 + 8 | 1 + 7 |
| Core strand | Structure | 3 + 9 + 15 | 3 + 9 + 12 | 3 + 9 + 15 | 3 + 9 + 15 | 3 + 9 + 15 |
| | Core Wire diameter (mm) | 0.290 | 0.260 | 0.350 | 0.400 | 0.350 |
| | First Sheath Wire diameter (mm) | 0.290 | 0.260 | 0.350 | 0.400 | 0.350 |
| | Second Sheath Wire diameter (mm) | 0.290 | 0.350 | 0.350 | 0.400 | 0.350 |
| Sheath strand | Structure | 3 + 9 + 15 | 3 + 9 + 12 | 3 + 9 + 15 | 3 + 9 | 3 + 9 + 15 |
| | Core Wire diameter (mm) | 0.290 | 0.260 | 0.395 | 0.350 | 0.350 |
| | First Sheath Wire diameter (mm) | 0.290 | 0.260 | 0.395 | 0.350 | 0.350 |
| | Second Sheath Wire diameter (mm) | 0.290 | 0.350 | 0.395 | — | 0.350 |
| Cord | Cord diameter (mm) | 5.18 | 5.18 | 5.27 | 5.21 | 5.3 |
| | Sheath strand cross section S (mm$^2$) | 2.50 | 2.49 | 2.12 | 1.66 | 2.17 |
| | $\alpha$ (rad) | 1.417 | 1.417 | 1.417 | 1.417 | 1.417 |
| | r (mm) | 1.785 | 1.780 | 1.898 | 1.958 | 1.909 |
| | $\phi 1$ (mm) | 0.290 | 0.350 | 0.350 | 0.400 | 0.350 |
| | $\phi 2$ (mm) | 0.290 | 0.350 | 0.395 | 0.350 | 0.350 |
| | $[(S \cdot \cos^2\alpha)/\{r \cdot (\phi 1 + \phi 2)\}] \times 100$ | 5.7 | 4.7 | 3.5 | 2.7 | 4.2 |
| | Shear resistance (Index) | 100 | 103 | 122 | 126 | 105 |
| | Tire weight (Index) | 100 | 100.3 | 100.3 | 100 | 100.5 |
| | Number of cuts incurred (n) | 12 | 10 | 1 | 1 | 8 |

It is obvious from the evaluation results in Table 1 that the shear resistance was improved and the number of cuts incurred was decreased without increasing the tire weight in any of Examples 1 to 3.

[Reference Signs List]
1 Core strand
2 Sheath strand
3 Wrapping wire
20 Bead core
21 Carcass
22 Belt
23 Tread

The invention claimed is:

1. A steel cord for reinforcing a rubber article with a multi-twisted structure formed by twisting a plurality of sheath strands formed by twisting a plurality of wires around a core strand formed by twisting a plurality of wires, and the core strand and the sheath strands being constituted of an at least 2-layer-twisted structure formed by twisting core wires and sheath wires respectively, wherein the diameter of an outermost wire of the core strand ($\phi 1$) (mm), the diameter of an outermost wire of the sheath strand ($\phi 2$)(mm), the center distance between the core strand and the sheath strand (r)(mm), the cross section of the sheath strand (S)(mm$^2$) and the twist angle of the sheath strands ($\alpha$) represented by the following formula:

$$\alpha(\text{rad}) = (\pi/2) - \tan^{-1}[\{(cd-sd)/sp\}\pi]$$

wherein (cd) stands for the cord diameter (mm), (sd) for the sheath strand diameter (mm), and (sp) for the sheath strand pitch (mm);

satisfy the relationship represented by the following formula:

$$1.8 \leq [(S \cdot \cos^2\alpha)/\{r \cdot (\phi 1 + \phi 2)\}] \times 100 \leq 4.2.$$

2. The steel cord for reinforcing a rubber article according to claim 1, wherein the core strand has a 3-layer-twisted structure with a plurality of twisted wires and the number of the sheath strands is 7 to 10.

3. The steel cord for reinforcing a rubber article according to claim 1, wherein the cord diameter cd is 5.0 mm or larger.

4. A pneumatic tire having a carcass as a skeletal structure comprising ply(s) of radially oriented cords bridging a left-and-right pair of beads and extending toroidally, as well as a belt located on the outer side in the radial direction of the tire at a crown part of the carcass, wherein the belt comprises at least 4 belt plies each with arrayed cords, which are crossed between the laminated plies, and the cords constituting at least 2 of the belt plies are the steel cords for reinforcing a rubber article according to claim 1.

* * * * *